US008807264B2

(12) United States Patent
Kempf

(10) Patent No.: US 8,807,264 B2
(45) Date of Patent: Aug. 19, 2014

(54) METHOD AND APPARATUS FOR MANUAL ACCELERATION IN MOTOR VEHICLES

(76) Inventor: Martine Kempf, Sunnyvale, CA (US)

( * ) Notice: Subject to any disclaimer, the term of this patent is extended or adjusted under 35 U.S.C. 154(b) by 616 days.

(21) Appl. No.: 12/962,261

(22) Filed: Dec. 7, 2010

(65) Prior Publication Data

US 2011/0239985 A1    Oct. 6, 2011

(30) Foreign Application Priority Data

Dec. 10, 2009 (DE) .......... 10 2009 057 806

(51) Int. Cl.
*G05G 7/00* (2006.01)
*G05G 7/04* (2006.01)

(52) U.S. Cl.
USPC ............... 180/335; 180/320; 74/481; 74/482; 701/110

(58) Field of Classification Search
CPC ...... B60K 26/02; B60K 26/021; B60K 26/04; G05G 7/00; G05G 7/04; G05G 2700/16; G05G 2009/0474; G05G 2009/04748; G05G 2009/04762; F02D 11/00; F02D 11/02
USPC ................. 123/395, 396, 399, 400, 682, 683; 180/178, 179, 335, 320, 336, 333; 701/103, 104, 110; 74/481, 482
See application file for complete search history.

(56) References Cited

U.S. PATENT DOCUMENTS

| 4,078,628 | A | * | 3/1978 | Reichenberger | 180/333 |
| 4,476,954 | A | * | 10/1984 | Johnson et al. | 180/333 |
| 4,718,380 | A | * | 1/1988 | Katayose et al. | 123/399 |
| 5,947,227 | A | * | 9/1999 | Kempf | 180/335 |
| 6,161,449 | A | * | 12/2000 | Fujimori | 74/557 |
| 6,263,753 | B1 | * | 7/2001 | Froehlich | 74/482 |
| 6,442,472 | B1 | * | 8/2002 | Vivek et al. | 701/110 |
| 6,874,469 | B2 | * | 4/2005 | Tachibana et al. | 123/396 |
| 7,206,690 | B2 | * | 4/2007 | Kuwahara et al. | 701/110 |
| 8,096,207 | B2 | * | 1/2012 | Kazanchy | 74/481 |

FOREIGN PATENT DOCUMENTS

| EP | 0829388 A2 | * | 3/1998 |
| EP | 1200283 A1 | * | 5/2002 |

* cited by examiner

Primary Examiner — Thomas Moulis
Assistant Examiner — Elizabeth Hadley
(74) Attorney, Agent, or Firm — Godfrey & Kahn, S.C.; Nicholas A. Kees

(57) ABSTRACT

A method and apparatus for the acceleration of a motor vehicle comprising a manually operable control member, a throttle pedal (4) actuatable by the control member and a computer (3). The control member may comprise a known-per-se throttle ring. There is provided a speed sensor (2) to detect the speed of the motor vehicle and to generate a corresponding speed signal (V). Computer (3) has stored therein transmission ratio curves (V1, V2, V3 ... Vn) each applicable to a different vehicle speed, with each such transmission ratio curve (V1, V2, V3 ... Vn) representing a ratio of transmitting the amount of actuation of the control member to the applicable stroke of throttle pedal (4). Computer (3) uses the speed signal (V) provided by speed sensor (2) to select one of transmission ratio curves (V1, V2, V3 ... Vn) for actuating throttle pedal (4) with a stroke corresponding to the transmission ratio curve (V1, V2, V3 ... Vn) selected.

13 Claims, 1 Drawing Sheet

Beispiele von 3 Übersetzungskurven

X-Achse = Hub des Gasringes (0 = Leerlauf, 256 = Vollgas)

Y-Achse = Hub des Gaspedals (0 = Leerlauf, 256 = Vollgas)

METHOD AND APPARATUS FOR MANUAL ACCELERATION IN MOTOR VEHICLES

FIELD OF THE INVENTION

The present disclosure relates to a method and apparatus for the manual acceleration in motor vehicles to be used particularly by handicapped persons.

BACKGROUND OF THE INVENTION

DE 196 26 625 A1 discloses a device of this kind. It comprises a manually operable hand throttle ring mounted to be concentric with the circular steering wheel of a motor vehicle and having a smaller diameter than the steering wheel. The hand throttle ring is movable against the force exerted by energy storage means to act upon an actuating member. The actuating member moves a control rod mounted for axial movement inside the steering column of the motor vehicle. The control rod in turn actuates the conventional throttle pedal of the motor vehicle.

A device of this kind converts the stroke, or the depression distance, of the hand throttle ring into a movement of the throttle pedal to perform a predetermined stroke or amount of depression.

Conventionally, the stroke of a throttle pedal in a motor vehicle is about 60 mm average when actuated from idle to full throttle. In contrast, the stroke of a hand throttle ring is about 18 mm from idle to full throttle. What this means is that acceleration—especially on start-up and the concomitant actuation of the hand throttle ring—may result in a jerky and imprecise start-up process, which the driver and a passenger will find most unpleasant.

SUMMARY OF THE INVENTION

The object underlying the present disclosure is to provide a method and apparatus for the manual acceleration in motor vehicles and designed so as to avoid sudden changes of motor speed, which may be found to be unpleasant, particularly if the vehicle starts up from idle.

This object is achieved by an acceleration system for motor vehicles having the features recited in patent claim 1.

The essential advantage of the present disclosure resides in the possibility of avoiding aforesaid undesirable and unpleasant motor speed changes during manual acceleration—especially when starting up from idle—by automatically changing the transmission ratio from the stroke of the hand throttle ring to the stroke of the throttle pedal in dependence on the speed of the motor vehicle. As a result, a relatively long stroke of actuation of the hand throttle ring which is performed at a relatively low speed of the motor vehicle may result in a relatively short stroke of the throttle pedal, whereas the stroke of the hand throttle ring is transmitted almost linearly to throttle pedal stroke when the motor vehicle speed is relatively high. In this context, it is important for the full stroke of the throttle pedal from idle to full throttle to be available at any time for the stroke the hand throttle ring is able to perform, and this at any detected speed of the motor vehicle.

The following additional advantages are obtainable with the present disclosure. In addition to a soft start-up, which may be obtained in an easy and simple manner, the vehicle may be controlled safely and pleasantly to park and back up. Advantageously, driving in street traffic is possible economically as jerky acceleration is obviated. At higher speeds, acceleration requires slighter depression only of the hand throttle ring than at slower speeds. For this reason, the driver maintains a pleasant and ergonomic position of his hands. High-speed overtaking maneuvers are possible in a simple and precise manner as the transmission of the hand throttle ring to the throttle pedal is more direct. Summarizing, it may be stated that the speed-dependent actuation of the hand throttle ring and of the throttle pedal advantageously results in a markedly enhanced driving safety in all situations and at any speed.

Advantageously, the speed-dependent conversion of the stroke of the hand throttle ring to stroke of the throttle pedal is variable and adaptable to a variety of vehicle models.

Advantageous further developments of the disclosure are recited in the dependent claims.

The disclosure and its embodiments are explained below in greater detail under reference to the drawings.

DETAILED DESCRIPTION

Figure 1:
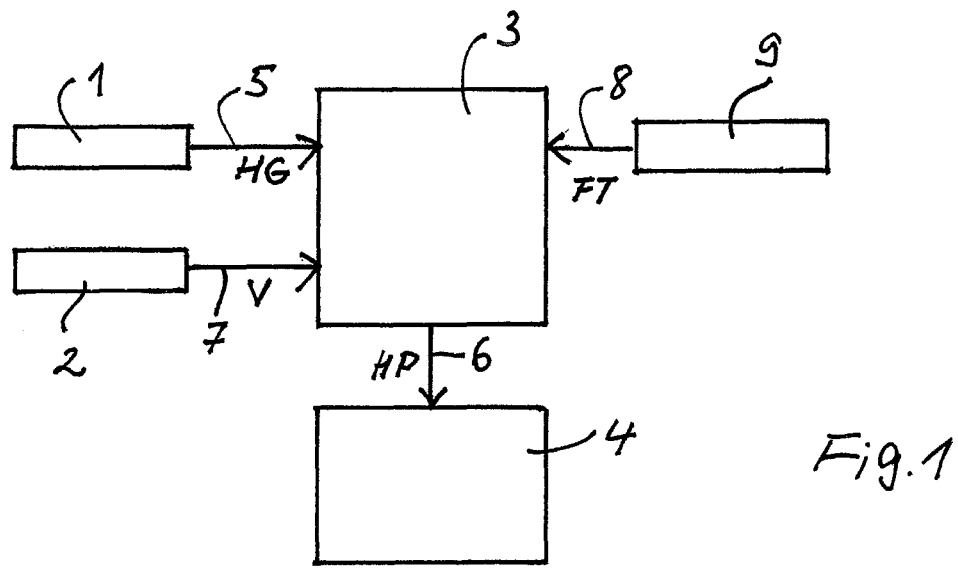
FIG. 1 schematically shows a block diagram of the inventive system for acceleration in a motor vehicle.

In accordance with FIG. 1, the present disclosure for acceleration in a motor vehicle—especially by means of a manually actuatable hand throttle ring—comprises a computer 3, a speed sensor 2 and a throttle pedal 4. As is known, throttle ring 1 is preferably located inside the annular steering wheel of the motor vehicle. Its diameter is conveniently smaller than the steering wheel's. As throttle ring 1 is depressed axially of the steering column of the steering wheel, an output signal HG is generated on a line 5 which corresponds to the amount throttle ring 1 is depressed or to the stroke thereof, respectively. Output signal HG is transmitted to computer 3. At its line 6, computer 3 can provide a control signal HP for actuating throttle pedal 4 with a stroke determined by computer 3.

As explained initially, throttle pedal 4 is supposed to be actuated in dependence on vehicle speed. To this end, vehicle speed is detected by means of a speed sensor 2, which provides a corresponding speed signal V to computer 3 on line 7.

The memory of computer 3 stores so-called transmission ratio curves to be used for various speeds of the motor vehicle. For different speeds, these transmission ratio curves determine the transmission ratios by which the stroke of hand throttle ring 1 is converted to the applicable stroke of throttle pedal 4.

Figure 2:
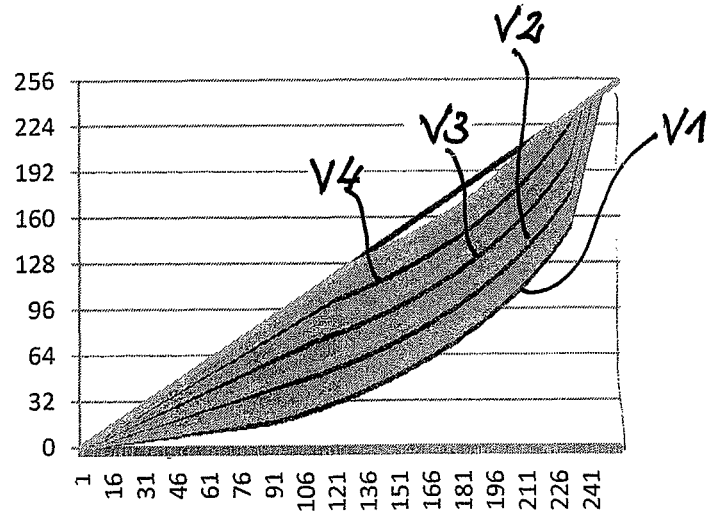
FIG. 2 is a diagram showing exemplary transmission ratios of the stroke of a manually actuatable throttle ring to the stroke of a conventional throttle pedal.

FIG. 2 shows transmission ratio curves V1, V2, V3 . . . Vn of this kind, with the stroke of hand throttle ring 1 shown along the x-axis and the stroke of throttle pedal 4 along the y-axis. As may be recognized, a longer stroke (or amount of depression) of hand throttle ring 1 will in the case of slower speeds (such as V1) result in a shorter stroke (or amount of depression) of throttle pedal 4, whereas in the case of a higher speed (such as V3) of the motor vehicle the same stroke (or amount of depression) of hand throttle ring 1 results in a longer stroke (or amount of depression) of throttle pedal 4. What this means is that at an actual motor vehicle speed, as is determined by speed sensor 2, computer 3 will select on the basis of the speed signal V it receives a corresponding transmission function from its memory and will determine—in dependence on this transmission function—the applicable ratio of converting the amount of depression of hand throttle ring 1 to that of throttle pedal 4. Recognizably, the dependence of the amount of depression of throttle pedal 4 on the amount of depression of hand throttle ring 1 tends to be more linear at higher vehicle speeds.

It is pointed out that, instead of the hand throttle ring 1 explained above, any other control member may be provided which is manually operable by a handicapped person—such as any manually operable throttle actuating element. Preferably, throttle pedal 4 is actuated mechanically or by an electric motor on the basis of the control signal provided by computer 3 on line 6. In a motor vehicle equipped with a so-called electronic throttle pedal 4, which is actuated by electronic signals generated by computing means in the motor vehicle, it is contemplated for the aforesaid computer 3 to directly provide the control signals HP it generates to the vehicle's computing means. It is conceivable likewise to use control signal HP on line 6 to directly actuate the throttle valve of the motor vehicle instead of throttle pedal 4.

Speed sensor 2 may be any sensor which derives a speed signal from the vehicle speedometer cable or measures the speed or r.p.m.'s of the wheel axles. It is conceivable also for the speed sensor to evaluate electronic signals available at field busses—such as the CAN bus, the OBD2 diagnosis connector or any other diagnosis connector of the vehicle.

In a special embodiment of the present disclosure, it is possible furthermore to vary transmission ratio curves V1, V2, V3 . . . Vn in dependence on the vehicle type or model. To this end, a member 9 may be provided to supply computer 3 on line 8 with a vehicle type signal FT.

REFERENCE CHARACTERS

1 throttle ring
2 speed sensor
3 computer
4 throttle pedal
5 signal line
6 signal line
7 signal line
8 signal line
9 member for inputting the type of vehicle
HG output signal
V speed signal
HP control signal
FT vehicle type signal
V1, V2, V3 . . . Vn transmission ratio curves
  Caption of FIG. 2
Three exemplary transmission ratio curves:
X-axis=throttle ring stroke (0=idle, 256=full throttle)
Y-axis=throttle pedal stroke (0=idle, 256=full throttle)

What is claimed is:

1. A method of actuating a throttle pedal in a motor vehicle capable of moving at various motor vehicle speeds, the motor vehicle having a manually operable control member and a throttle pedal actuatable by said control member, said method comprising:
   detecting the motor vehicle speed;
   generating a corresponding speed signal:
   using a computer having transmission ratio curves, wherein each of the transmission ratio curves is applicable to a different motor vehicle speed and represents a ratio of an amount of actuation of the control member relative to an applicable stroke of the throttle pedal,
   selecting on the basis of the speed signal one of the transmission ratio curves; and
   actuating the throttle pedal with the applicable stroke corresponding to the one of the transmission ratio curves selected.

2. An apparatus for a motor vehicle having a throttle pedal and capable of traveling at various motor vehicle speeds, the apparatus comprising:
   a manually operable control member actuatably controlling the throttle pedal;
   a computer having stored therein transmission ratio curves; and
   a speed sensor able to detect the motor vehicle speed and to generate a corresponding speed signal;
   wherein each of the transmission ratio curves is applicable to a different motor vehicle speed and causes a different ratio of actuation of the throttle pedal by an applicable stroke of the control member;
   the computer being adapted to select based upon the speed signal one of the transmission ratio curves for actuating a throttle through the throttle pedal with the applicable stroke corresponding to the selected one of the transmission ratio curves.

3. The apparatus as in claim 2, wherein the control member comprises a manually operable throttle ring such that when the throttle ring is depressed, an output signal is generated corresponding to an amount the throttle ring is depressed and transmitted to the computer.

4. The apparatus as in claim 2 wherein the amount of actuation of the control member relative to the applicable stroke of the throttle pedal, is larger at a low motor vehicle speed and smaller at a high vehicle speed.

5. The method of claim 1 further comprising using a speedometer cable of said motor vehicle wherein the speed sensor can detect the motor vehicle speed using the speedometer cable.

6. The method of claim 1 further comprising using a wheel axle of the motor vehicle wherein the speed sensor can detect the motor vehicle speed using the wheel axle.

7. The method of claim 1 further comprising using electronic signals available at a field bus of the motor vehicle wherein the speed sensor can detect the motor vehicle speed using the electronic signals.

8. The apparatus of claim 2 wherein each of the transmission ratio curves are additionally applicable to a type of vehicle.

9. The apparatus of claim 2 wherein the throttle pedal is adapted to be actuated by a foot of a driver.

10. The apparatus of claim 2 wherein the throttle pedal is electronic and controlled by a computing means of the motor vehicle.

11. The method of claim 7 wherein the electronic signals are a CAN bus of the motor vehicle.

12. The method of claim 7 wherein the electronic signals are a diagnosis connector of the motor vehicle.

13. The apparatus of claim 10 wherein the computing means forms a computer.

\* \* \* \* \*